H. KELSEY & W J. NEWTON.
Fruit-Gatherers.
No. 151,136.    Patented May 19, 1874.
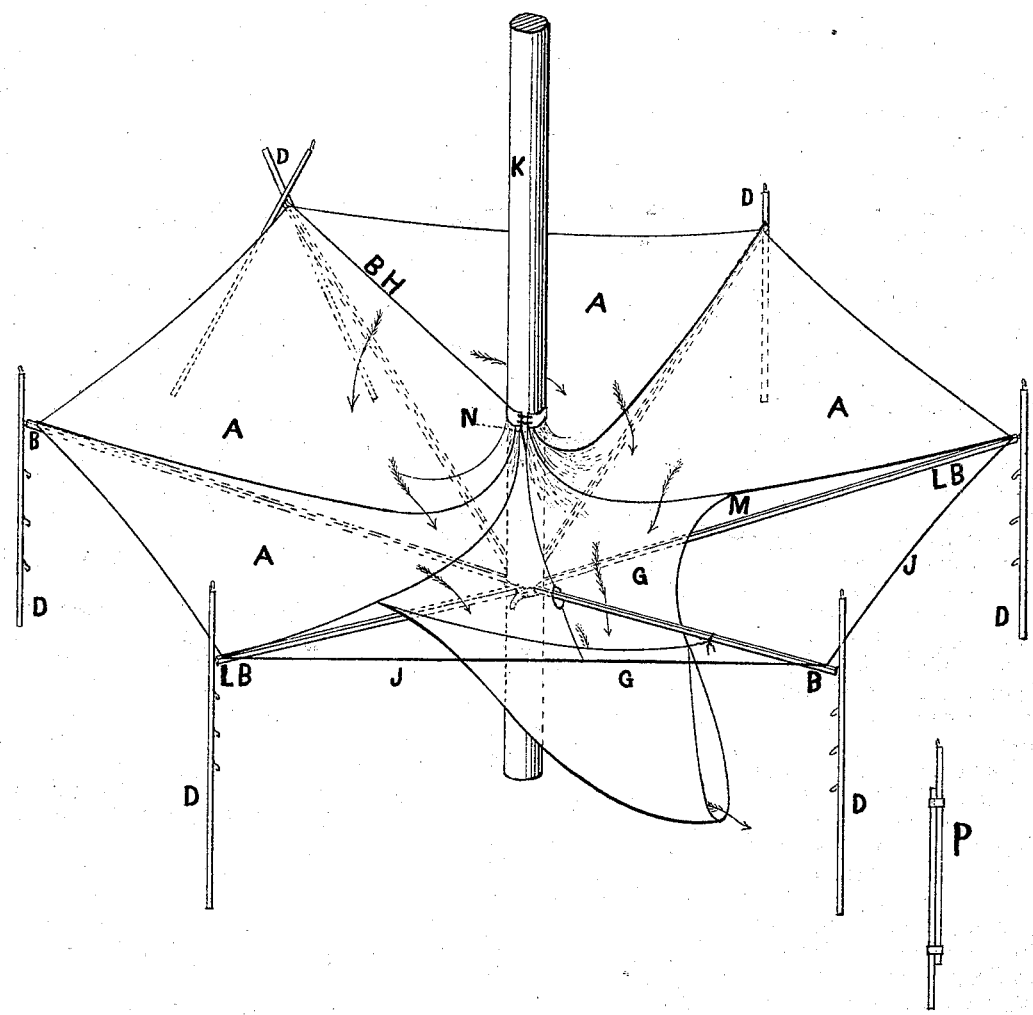

UNITED STATES PATENT OFFICE.

HORACE KELSEY AND WILLIAM J. NEWTON, OF OTTAWA, KANSAS.

IMPROVEMENT IN FRUIT-GATHERERS.

Specification forming part of Letters Patent No. 151,136, dated May 19, 1874; application filed February 9, 1874.

*To all whom it may concern:*

Be it known that we, HORACE KELSEY and WILLIAM JUDSON NEWTON, of Ottawa, in the county of Franklin and State of Kansas, have invented new and useful Improvements on the Fruit-Gatherer patented by Horace Kelsey, May 6, 1873, No. 138,565, of which the following is a specification:

In the drawing the sections of the body A between the arms L B are removed to better show the spout G. The body A is attached to the radial arms B at their outer ends only, and the fastenings may be such as to permit it to be readily detached. To prevent the fruit from colliding and cause it to pass gently around the tree to the spout, the body A is elevated opposite the spout, forming a ridge from the tree to the outer edge, as shown at B H, dividing the rolling fruit into two distinct courses to the spout, as indicated by the arrows.

The spout G operates as a combined double and single spout, receiving and keeping separate the streams of fruit, until their courses become parallel, which is effected simply by cutting out a strip of the cloth forming the spout from the opening for the arm upward to the tree, then bringing together and sewing these edges; the spout in this part will be thrown into a ridge, completely separating the flowing or rolling streams of fruit, as shown. The inner ends of the arms B are fastened to the tree by a cord or strap passed through loops or other device at or near their ends. The elevation of the body above the arm is shown at M.

Cushions may be used on large limbs of a tree and portions of arms, if necessary.

By dropping and opening the lower end of the spout, the operator may easily ascend the tree for shaking the fruit off.

In applying the gatherer to the tree for use, the strap with beveled blocks is first fastened to the tree. The gatherer is then passed around the tree, and the inner ends of the radial arms fastened above the blocks. The center of the body A is then elevated, and secured to the tree. The outer ends of the arms are then raised to proper position, the radial or raised side fastened, and all is ready for use.

The gatherer is adjusted and worked so as to pass all fruit falling thereon slowly or rapidly at pleasure, without bruising, to the receptacle below.

A center piece, K, to which a small gatherer may be attached in the same manner as to a tree, and to the upper end of which is secured a hook, peg, or other device, by which it may be attached to any limb desired, enables the operator to gather from large trees.

We claim as our invention—

In a fruit-gatherer, the body A with its elevated center, in combination with the double-channeled spout G, as and for the purpose specified.

HORACE KELSEY.
WM. J. NEWTON.

Witnesses:
I. FALES,
J. S. BURNHAM.